US010191311B2

United States Patent
Bai et al.

(10) Patent No.: US 10,191,311 B2
(45) Date of Patent: Jan. 29, 2019

(54) DISPLAY DEVICE AND CHARGING METHOD THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Bing Bai, Beijing (CN); Jiuxia Yang, Beijing (CN); Feng Bai, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 921 days.

(21) Appl. No.: 14/387,961

(22) PCT Filed: Dec. 14, 2013

(86) PCT No.: PCT/CN2013/089447
§ 371 (c)(1),
(2) Date: Sep. 25, 2014

(87) PCT Pub. No.: WO2014/173147
PCT Pub. Date: Oct. 30, 2014

(65) Prior Publication Data
US 2016/0282651 A1 Sep. 29, 2016

(30) Foreign Application Priority Data
Apr. 26, 2013 (CN) .......................... 2013 1 0150730

(51) Int. Cl.
G09G 3/36 (2006.01)
G02F 1/133 (2006.01)
(Continued)

(52) U.S. Cl.
CPC ....... *G02F 1/13318* (2013.01); *G09G 3/3648* (2013.01); *H02J 7/008* (2013.01);
(Continued)

(58) Field of Classification Search
CPC ..... G09G 2360/144; G09G 2320/0626; G09G 3/20; G09G 3/3648
See application file for complete search history.

(56) References Cited

U.S. PATENT DOCUMENTS 5,686,979 A * 11/1997 Weber .................. E06B 9/24
349/96
6,323,923 B1 * 11/2001 Hoshino ............... G02F 1/1333
349/113

(Continued)

FOREIGN PATENT DOCUMENTS

CN 103246098 A 8/2013

OTHER PUBLICATIONS

International Search Report Appln. No. PCT/CN2013/089447; dated Mar. 27, 2014.
(Continued)

*Primary Examiner* — Alexander Eisen
*Assistant Examiner* — Mansour M Said
(74) *Attorney, Agent, or Firm* — Ladas & Parry LLP (57) ABSTRACT

A display device comprises a display panel and a backlight source, the display panel having an upper substrate and a lower substrate disposed opposite to the upper substrate. The display device further includes a transparent solar battery arranged at the upper substrate, a photosensitive coating arranged in a non-transparent region of the display panel and configured to sense the light from the backlight source, and a signal processing unit connected to the photosensitive coating and the transparent solar battery. The signal processing unit determines the working state of the display (Continued)

device according to changes in resistance of the photosensitive coating, and makes the transparent solar battery recharge or not recharge a rechargeable battery of the display panel.

20 Claims, 6 Drawing Sheets

(51) Int. Cl.
  *H02J 7/00* (2006.01)
  *H02J 7/35* (2006.01)
(52) U.S. Cl.
  CPC .... *H02J 7/355* (2013.01); *G02F 2001/13312* (2013.01); *G02F 2001/13324* (2013.01); *G09G 2330/022* (2013.01); *G09G 2360/145* (2013.01)

(56) References Cited

U.S. PATENT DOCUMENTS

| | | | | |
|---|---|---|---|---|
| 7,339,636 | B2 * | 3/2008 | Voloschenko | G02F 1/133555 349/106 |
| 8,040,473 | B2 * | 10/2011 | Yanai | G02B 5/201 349/110 |
| 2002/0029798 | A1 * | 3/2002 | Miyoshi | G04C 10/02 136/244 |
| 2005/0117096 | A1 * | 6/2005 | Voloschenko | G02F 1/133555 349/114 |
| 2006/0101685 | A1 * | 5/2006 | Smith, III | G09F 3/10 40/556 |
| 2007/0247572 | A1 * | 10/2007 | Hung | G02F 1/133555 349/114 |
| 2008/0303788 | A1 * | 12/2008 | Kurashima | G06F 3/014 345/156 |
| 2009/0135167 | A1 * | 5/2009 | Sakai | G02F 1/13318 345/207 |

OTHER PUBLICATIONS

First Chinese Office Action Appln. No. 201310150730.5; dated Feb. 12, 2015.

International Preliminary Report on Patentability dated Oct. 27, 2015, PCT/CN2013/089447.

* cited by examiner

DISPLAY DEVICE AND CHARGING METHOD THEREOF

TECHNICAL FIELD

Embodiments of the present disclosure relate to a display device and a recharging method thereof.

BACKGROUND

With continuous popularization and spreading applications of electronic apparatus, such as cellular telephones, a tablet PC and the like, endurance ability of handheld mobile apparatuses gets to be a big concern. However, a display device is a high energy-consuming device among components of the electronic apparatus. In particular, for a smart phone, the power consumption is large when it is used to perform surfing on the internet, interactive games, etc. As these electronic apparatuses can not be charged anytime and anywhere, the service time of these electronic apparatuses are limited in some extent.

Thus, endurance ability of electronic apparatuses has been one of concerns of users, and also one of the urgent problems to be solved by manufacturers and researchers of the electronic apparatuses.

SUMMARY

According to one aspect of embodiments of the present disclosure, a display device is provided, a battery of which can be recharged in real time without disturbing displaying, and thus service time of the display device is elongated effectively.

Embodiments of the present disclosure achieve the above objects by following technical solution.

A display device comprises a display panel, a backlight source and a rechargeable battery, wherein the display panel has an upper substrate and a lower substrate disposed to be opposite to the upper substrate, the backlight source is positioned at a side of the lower substrate of the display panel, and the rechargeable battery is configured to supply power to the display device. The display device further comprises a transparent solar battery disposed at the upper substrate and configured to recharge the rechargeable battery of the display device, a photosensitive coating disposed in a non-transparent region of the display panel and configured to sense the light emitted by the backlight source, and a signal processing unit connected to the photosensitive coating and the transparent solar battery. The signal processing unit determines a working state of this display device on basis of change of the signal from the photosensitive coating, and controls the solar battery to charge or not charge according to the working state of the display device.

The photosensitive coating is a photosensitive resistance coating. The area of the photosensitive coating is equal to or less than the area of the non-transparent region corresponding to the photosensitive coating.

The photosensitive coating is disposed on a light-incoming side of a black matrix of the upper substrate.

The photosensitive coating is disposed closely adjacent to a light-incoming side of a base substrate of the lower substrate or a light-exiting side of a base substrate of the lower substrate.

The transparent solar battery is disposed closely adjacent to a light-incoming side of a base substrate of the upper substrate or a light-exiting side of a base substrate of the upper substrate.

The lower substrate further comprises a pixel electrode and a common electrode.

The transparent solar battery comprises a switching device which is also connected to and controlled by the signal processing unit, such that the transparent solar battery recharge the rechargeable battery or not.

The switching device can be a switching diode or a switching triode. The switching device can also be any other switching devices which are capable of realizing switching of a circuit.

According to one embodiment of the present disclosure, a recharging method for the above display device is provided. The method comprises: sensing light of a backlight source through a photosensitive coating; judging, by a signal processing unit, whether the display device is in a working state or not according to whether the photosensitive coating senses the light of the backlight source or not; and controlling, by the signal processing unit, a transparent solar battery to recharge if the display device is in a non-working state.

Further, judging, by the signal processing unit, whether the display device is in the working state by means of the photosensitive coating comprises:

the signal processing unit judging that the display device is in the working state upon a variation of the resistance value of the photosensitive resistance coating with respect to an initial resistance value; and the signal processing unit judging that the display device is in the non-working state upon no variation of the resistance value of the photosensitive resistance coating with respect to the initial resistance value; wherein the initial resistance value is the resistance value when the photosensitive resistance coating does not sense the backlight source.

Embodiments of the present disclosure provide a display device and a recharging method thereof. The display device comprises a display panel, a backlight source, a transparent solar battery disposed at the display panel, a photosensitive coating disposed in a non-transparent region of the display panel and configured to sense light from the backlight source, and a signal processing unit connected to the photosensitive coating and the transparent solar battery plate. The display device further comprises a rechargeable battery configured to supply power to the display device. The transparent solar battery is connected to the chargeable battery through a switching device. The signal processing unit judges the working state of this display device by detecting a variation of the signal from the photosensitive coating. When the display device is in an image-displaying state, the signal processing unit controls the switching device to switch it off such that the transparent solar battery does not recharge the rechargeable battery. When the display device is in a standby state, the signal processing unit controls the switching device to switch it on such that the transparent solar battery recharges the rechargeable battery. Thus, a real-time recharging can be realized, a standby time can be elongated and endurance ability can be enhanced without disturbing the display device and increase the computation load thereof.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Embodiments of the present disclosure provide a display device. The display device comprises a display panel and a backlight source below the display panel, wherein the display panel has an upper substrate and a lower substrate disposed opposite to the upper substrate, and the backlight source is disposed on a side of the lower substrate. The display device further comprises a transparent solar battery configured to recharge the rechargeable battery of the display device and provided at the upper substrate, a photosensitive coating configured to sense the light emitted from the backlight source and provided in a non-transparent region of the display panel, and a signal processing unit connected to the photosensitive coating and the transparent solar battery plate, the signal processing unit determines a working state of this display device on basis of change of the signal from the photosensitive coating, and controls the solar battery to recharge the rechargeable battery when the display device works and controls the solar battery not to recharge the rechargeable battery when the display device does not work.

The display device further comprises a rechargeable battery for supplying power to the display device. The transparent solar battery is connected to the rechargeable battery through a switching device. The switching device is connected to the signal processing unit and switches between OFF/ON states under the control of the signal processing unit.

The signal processing unit judges the working state of this display device by detecting the state of the photosensitive coating. When the display device is in a displaying state, the signal processing unit controls the switching device to switch it OFF such that the transparent solar battery does not recharge the rechargeable battery. When the display device is in a standby state, the signal processing unit controls the switching device to switch it ON such that the transparent solar battery recharges the rechargeable battery.

The transparent solar battery can be a device which directly converts light energy into electrical energy through the photoelectric effect or the photochemical effect. For example, the transparent solar battery can be a transparent thin film solar battery.

The operation principle of a display device of embodiments of the present disclosure is as follows. When a photosensitive coating receives light from a backlight source, a signal processing unit judges that the display device (such as a display screen of a mobile phone) is in a working state on basis of change of the photosensitive coating. At this time, the signal processing unit controls the transparent solar battery not to recharge a rechargeable battery. When the photosensitive coating does not receive light from a backlight source, the signal processing unit judges that the display device (such as a display screen of a mobile phone) is in a standby state. At this time, the signal processing unit controls the transparent solar battery to recharge the rechargeable battery.

It needs to be explained that, firstly, the photosensitive coating configured to sense the light from the backlight source, in embodiments of the present disclosure, is referred to that the photosensitive coating changes due to its beginning to receive light or its ceasing receiving light. The change of the photosensitive coating can be a change which can be identified by the signal processing unit, such as changes of voltage, current, or resistance, and also can be changes of the color and the like. The materials of the photosensitive coating are not limited herein as long as the signal processing unit is capable of identifying the changes of the photosensitive coating and judging the state of the display device accordingly.

For example, the color of the photosensitive coating changes when the photosensitive coating receives the light emitted from the backlight source. When the display device is in the standby state, the photosensitive coating cannot receive the light of the backlight source, and the color of the photosensitive coating is an initial one without irradiated by the light. When the display device is in the working state, the photosensitive coating can receive the light from the backlight source, and under the effect of the light, the color of the photosensitive coating is changed from the initial color to a second color which is different from the initial color.

For example, the resistance of the photosensitive coating changes when the photosensitive coating receives the light emitted from the backlight source. When the photosensitive coating receives the light from the backlight source, the resistance of the photosensitive coating decreases or increases from an initial resistance to a second resistance. When the photosensitive coating cannot receive the light from the backlight source, the initial resistance of the photosensitive coating is maintained or the second resistance is changed to the initial resistance value, wherein the initial resistance is the resistance when the photosensitive coating is not irradiated by the light.

Secondly, the photosensitive coating is disposed in the non-transparent region, which means that a pattern of the photosensitive coating is entirely positioned in the non-transparent region of the display device, that is, the non-transparent region of the display device coincides with the photosensitive coating as seen in a direction perpendicular to the display panel of the display device. The shape and thickness of the photosensitive coating are not limited herein as long as the photosensitive coating can only sense the light from the backlight source.

Thirdly, the size and the position of the transparent solar battery are not limited herein as long as the transparent solar battery can receive the sunlight.

Fourthly, the signal processing unit can be an independent unit, and can also be a part of peripheral circuits of the display device, which is not limited herein.

The signal processing unit judges the working state of this display device by detecting the changes of the photosensitive coating. For example, the initial color of the photosensitive coating is changed to the second color after the photosensitive coating senses the light of the backlight source, the signal processing unit can judge that the display device is in the working state according to the state of the second color and output a signal "1" to the switching device, the switching device is switched to OFF after receiving the signal "1", and the solar battery does not recharge the rechargeable battery. When the photosensitive coating is recovered from the state of the second color to the state of the initial color, the signal processing unit can determine that the display device is in the standby state according to the state of the initial color and output a signal "0" to the switching device, the switching device is switched to ON after receiving this signal "0", and the solar battery recharge the rechargeable battery. The state of the initial color is a state of a color when the photosensitive coating does not sense the light of the backlight source.

For example, the initial resistance the photosensitive coating is changed from the first resistance to the second resistance after sensing the light from the backlight source, the signal processing unit can judge that the display device is in the working state according to the second resistance and output a signal "1" to the switching device, the switching device is switched to OFF after receiving the signal "1", and the solar battery does not recharge the rechargeable battery. When the photosensitive coating is recovered from the second resistance to the initial resistance, the signal processing unit can determine that the display device is in the standby state according to the initial resistance and output a signal "0" to the switching device, the switching device is switched to ON after receiving this signal "0", and the solar battery recharge the rechargeable battery. The initial resistance is a resistance value when the photosensitive coating does not sense the light of the backlight source.

The switching device can be a diode switching device or a triode switching device, and can also be any other devices which can achieve the switching function.

Fifthly, the display device can be any products or components with a displaying function, such as liquid crystal display devices, liquid crystal displays, liquid crystal televisions, digital photo frames, mobile phones, tablet computers, etc.

A display device comprises a display panel having an upper substrate and a lower substrate disposed opposite to the upper substrate, a backlight source situated on the upper substrate side of the display panel, and a rechargeable battery configured to supply power to the display device. The display device further comprises a transparent solar battery configured to charge the chargeable battery of the display device and provided at the upper substrate, a photosensitive coating provided in a non-transparent region of the display panel to sense the light from the backlight source, and a signal processing unit connected to the photosensitive coating and the transparent solar battery plate. The signal processing unit determines a working state of this display device according to changes of the signal from the photosensitive coating, and controls the solar battery to recharge or not recharge the rechargeable battery according to the working state of the display device. Thus, a real-time recharging can be realized, a standby time can be elongated and endurance ability can be enhanced without disturbing the display device and increasing the computation load.

For example, the photosensitive coating can be a photosensitive resistance coating.

The material of the photosensitive resistance coating can be a material, resistance of which changes greatly under the irradiation of the backlight source, such as cadmium sulfide, plumbum sulfide, etc. Here the "greatly" can be understood as the range that can be identified by the signal processing unit.

For example, area of the photosensitive coating is equal to or less than area of the non-transparent region opposite to the photosensitive coating.

In order to render the signal processing unit make a correct judgment on the working state of the display device, on one hand, it is required to keep the photosensitive coating to only sense the light emitted by the backlight source and bring about changes in color, on the other hand, it is required that the area of the photosensitive coating is as large as possible to delicately sense the light of the backlight source.

For example, as illustrated in FIGS. 1 to 10, for a liquid crystal display device 01, a display panel comprises a upper substrate 10 and a lower substrate 20 disposed opposite to the upper substrate 10, and a liquid crystal layer 40 disposed between the two substrates.

For example, as illustrated in FIGS. 1 to 4, the upper substrate 10 comprises a black matrix 104, a photosensitive coating 103 is disposed on an light-incoming side of the black matrix 104 of the upper substrate 10, and the pattern of the photosensitive coating 103 corresponds to the pattern of the black matrix 104. That is to say, the photosensitive coating 103 coincides with the black matrix 104 as seen along the direction of an incident light.

In all embodiments of the present disclosure, the incident light generally denotes the light emitted by a backlight source 30, and otherwise will be specifically explained.

Figure 1:
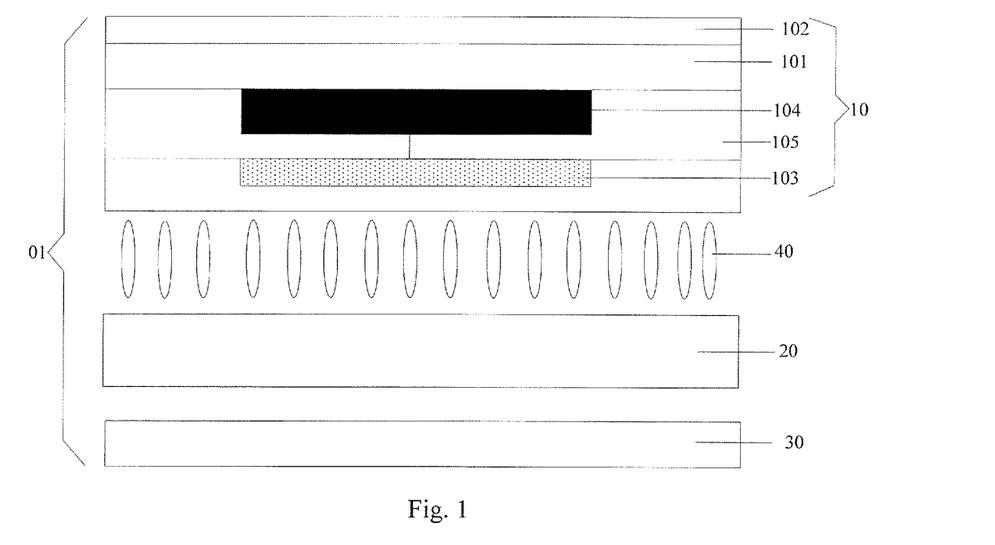
FIG. 1 is a first structure schematic view of a liquid crystal display device according to an embodiment of the present disclosure.
Figure 2:
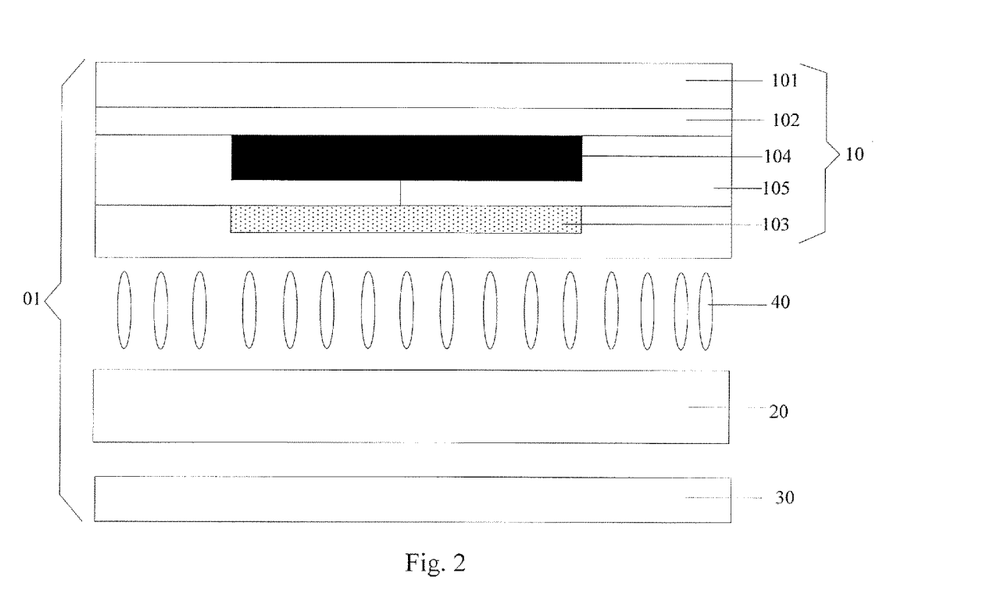
FIG. 2 is a second structure schematic view of a liquid crystal display device according to an embodiment of the present disclosure.

For example, as illustrated in FIG. 1 or 2, the photosensitive coating 103 can be disposed on a side of a color layer 105 away from the black matrix 104.

Figure 3:
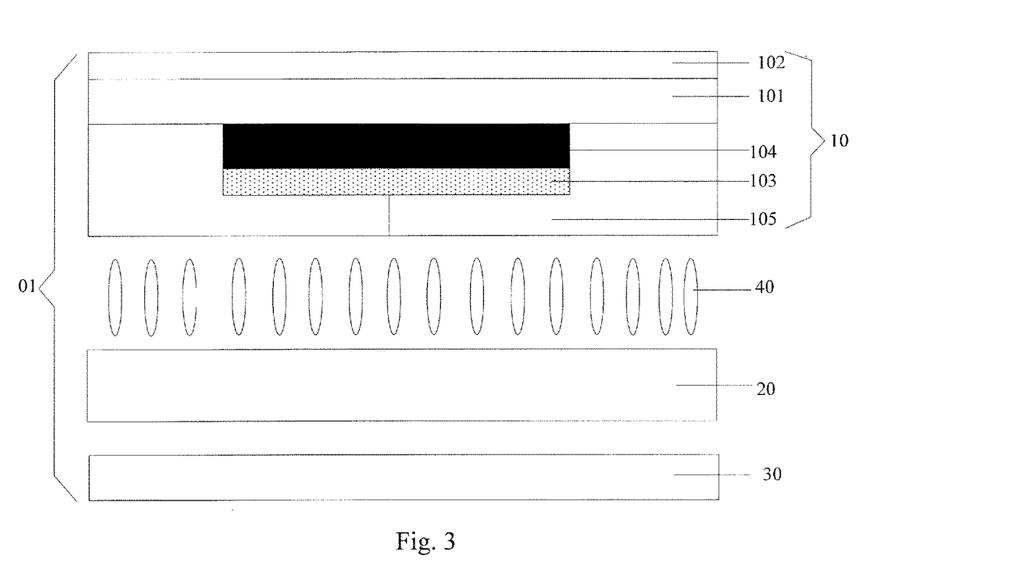
FIG. 3 is a third structure schematic view of a liquid crystal display device according to an embodiment of the present disclosure.
Figure 4:
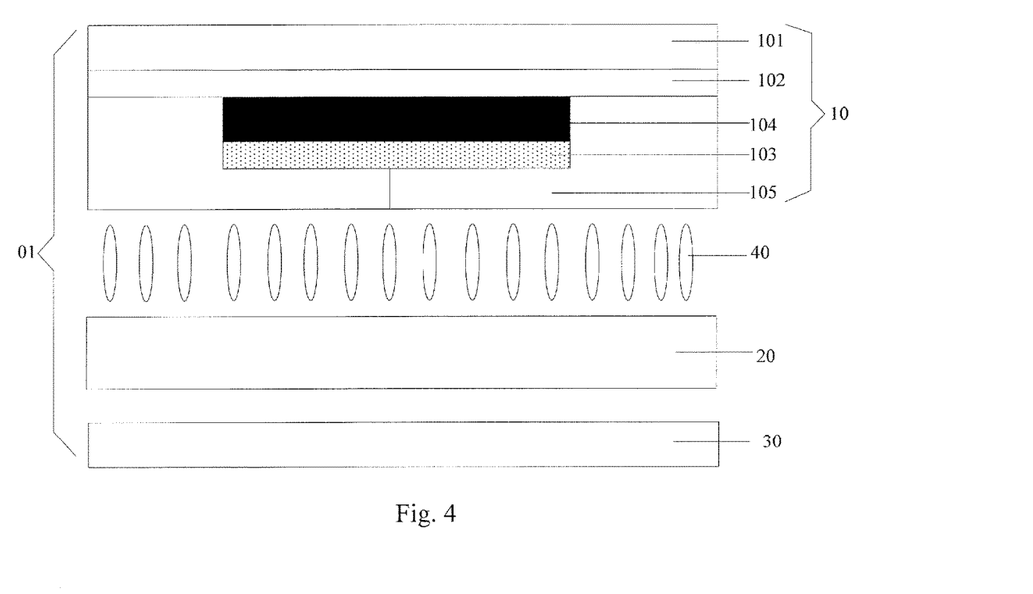
FIG. 4 is a fourth structure schematic view of a liquid crystal display device according to an embodiment of the present disclosure.

For example, as illustrated in FIG. 3 or 4, the photosensitive coating 103 can be arranged to be immediately close to the black matrix 104.

For the liquid crystal display device 01, the black matrix 104 on the upper substrate 10 divides this display device into a transparent region and a non-transparent region, and the area of the photosensitive coating 103 is equal to the area of the non-transparent region opposite to the photosensitive coating, that is to say, the area of the photosensitive coating 103 can be set to be equal to the area of the black matrix 104.

For example, as illustrated in FIG. 1 or 3, a transparent solar battery 102 is disposed to be immediately close to a light-exiting side of a first base substrate 101 of the upper substrate 10. Alternatively, as illustrated in FIG. 2 or 4, the transparent solar battery 102 is disposed to be immediately close to a light-incoming side of the first base substrate 101. In this way, the transparent solar battery 102 can completely receive ambient light, such as the sunlight, and thus solar energy can be converted into electrical energy to the maximum extent.

First Embodiment

Figure 5:
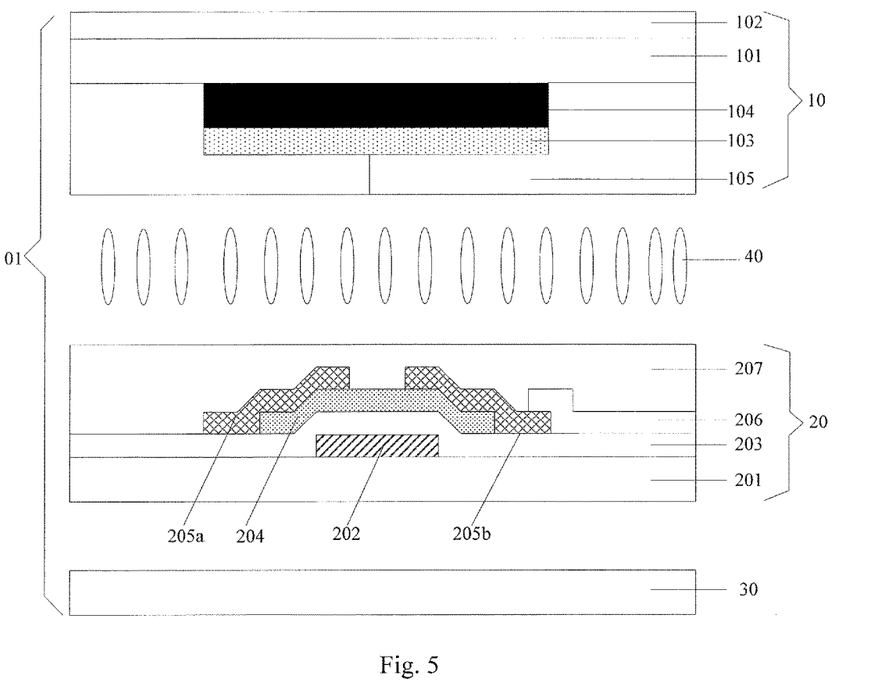
FIG. 5 is a structure schematic view of a liquid crystal display device according to a first embodiment of the present disclosure.

A first embodiment of the present disclosure provides a liquid crystal display device, as illustrated in FIG. 5. This liquid crystal display device 01 comprises an upper substrate 10, a lower substrate 20 disposed opposite to the upper substrate, a liquid crystal layer 40 arranged between the upper substrate and the lower substrate, a backlight source 30 and a signal processing unit (not illustrated in the figure).

The upper substrate 10 comprises a base substrate 101, a black matrix 104 arranged below the base substrate 101, a photosensitive coating 103 arranged below the black matrix, a color layer 105 arranged below the photosensitive coating 103, and a transparent solar battery 102 arranged above the base substrate 101.

This liquid crystal display device further comprises a rechargeable battery configured to supply the liquid crystal display device with power. The transparent solar battery is connected to the chargeable battery via a switching device.

In this embodiment, the black matrix 104 is firstly formed on the base substrate 101, the photosensitive coating 103 arranged below the black matrix 104 is formed, and then the color layer 105 is formed.

The area of the photosensitive coating 103 is equal to the area of the black matrix 104. For example, the color layer 105 can comprise a red photoresist, a green photoresist, a blue photoresist. The color layer 105 can also comprises photoresists of other colors.

The lower substrate 20 comprises a base substrate 201, a gate electrode 202 arranged on the base substrate 201, a gate insulating layer 203 arranged above the gate electrode and the base substrate, an active layer 204, a source electrode 205a and a drain electrode 205b arranged above the gate insulating layer, and a pixel electrode 206 electrically connected with the drain electrode, and a protection layer 207.

It is required to explain that, in this embodiment of the present disclosure, the lower substrate is described by taking a bottom gate type as an example, but the embodiment of the present disclosure is not limited to this, the lower substrate 20 can also be of a top gate type. In addition, the embodiment of the present disclosure is not limited to that the lower substrate 20 comprises a pixel electrode 206, but can further comprise a common electrode, without being limited herein. Furthermore, the embodiment of the present disclosure is illustrated by taking the photosensitive coating 103 arranged below the black matrix 104 and the transparent solar battery arranged on the light-exiting side of the first base substrate 101 as an example, but the embodiment of the present disclosure is not limited to this.

The embodiment of the present disclosure provides a liquid crystal display device comprising an upper substrate 10, a lower substrate 20, a liquid crystal layer 40 arranged between the two substrates, a backlight source 30 arranged on the side of the lower substrate, and a signal processing unit, wherein the upper substrate 10 comprises a transparent solar battery 102 arranged on a light-exiting side of a first base substrate, and a photosensitive coating 103 arranged on a light-incoming side of a black matrix 104. This liquid crystal display device further comprises a rechargeable battery configured to supply power to the liquid crystal display device. The transparent solar battery is connected to the rechargeable battery of the liquid crystal display device via a switching device. As the resistance of the photosensitive coating 103 increases or decreases with respect to an initial resistance when the photosensitive coating senses the light from the backlight source, and maintains or recovers to be the initial resistance when the photosensitive coating does not sense the light from the backlight source, the signal processing unit can judge whether the display device is in a working state by means of changes of the resistance of the photosensitive coating. When the display device is in the working state, the signal processing unit controls the switching device to switch OFF such that the transparent solar battery 102 does not recharge the rechargeable battery. When the display device is in a standby state, the signal processing unit controls the switching device to switch it ON such that the transparent solar battery 102 recharges the rechargeable battery. In this way, a real-time charging can be realized, a standby time can be elongated and endurance ability can be enhanced without disturbing the display device and increasing the computation load.

Figure 6:
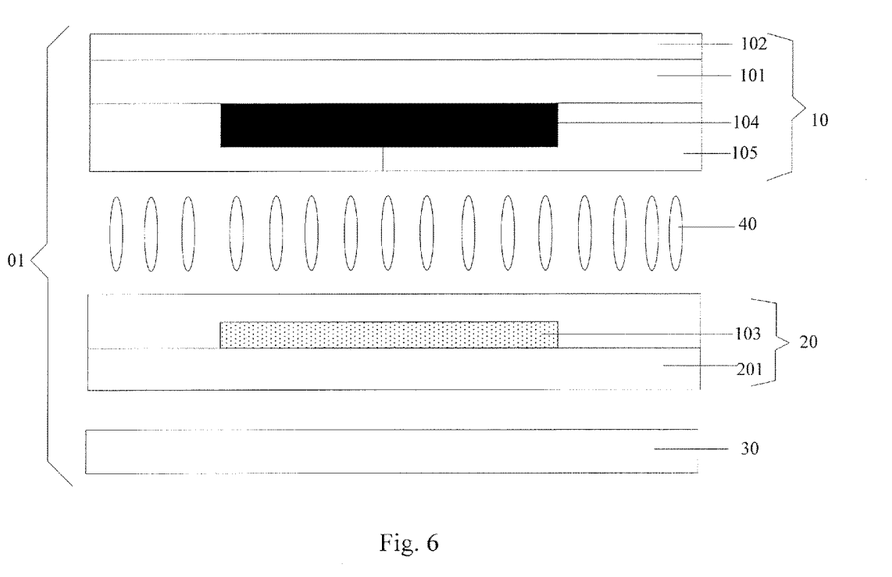
FIG. 6 is a fifth structure schematic view of a liquid crystal display device according to an embodiment of the present disclosure.
Figure 7:
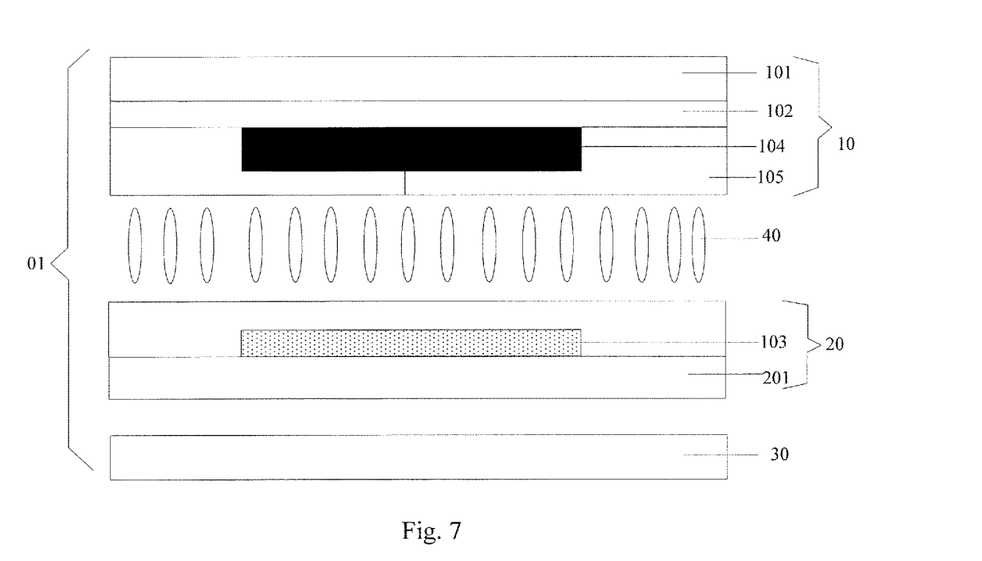
FIG. 7 is a sixth structure schematic view of a liquid crystal display device according to an embodiment of the present disclosure.
Figure 8:
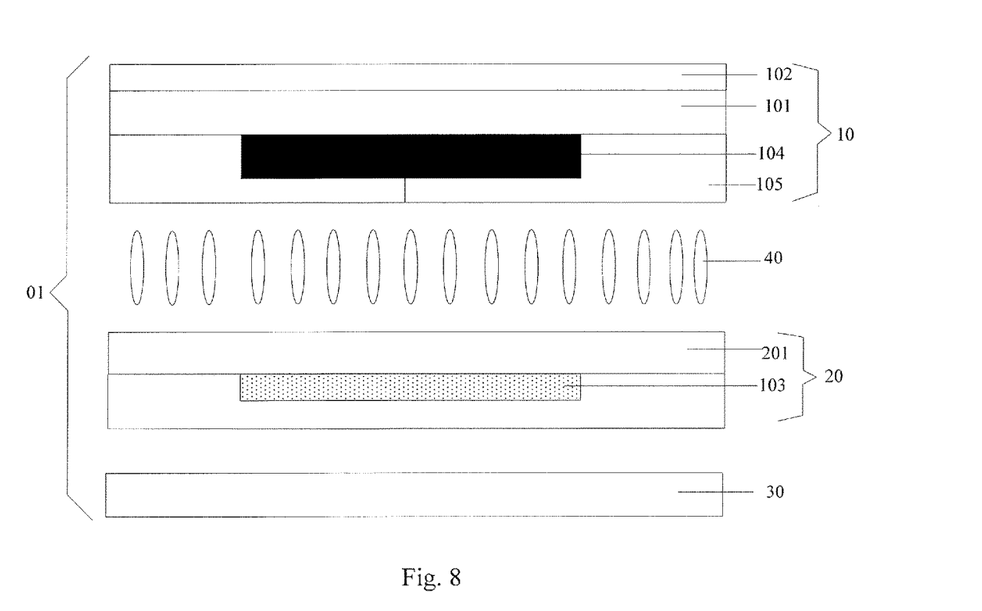
FIG. 8 is a seventh structure schematic view of a liquid crystal display device according to an embodiment of the present disclosure.
Figure 9:
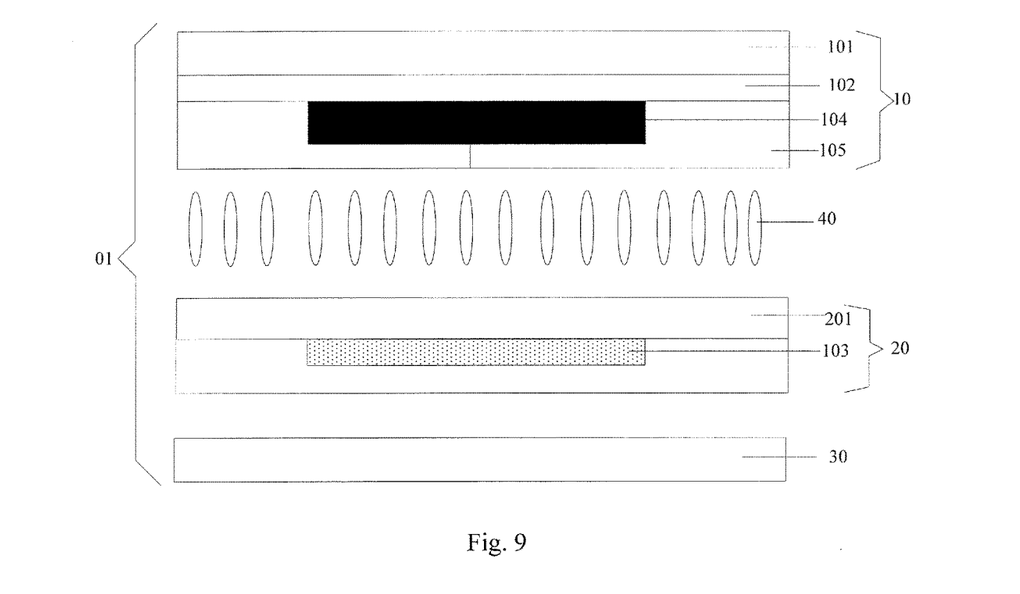
FIG. 9 is a eighth structure schematic view of a liquid crystal display device according to an embodiment of the present disclosure.

For example, as illustrated in FIG. 6 or 7, the photosensitive coating 103 is arranged to be immediately close to a light-exiting side of a second base substrate 201 of the lower substrate 20, or as illustrated in FIG. 8 or 9, the photosensitive coating 103 is arranged to be immediately close to a light-incoming side of the second base substrate 201 of the lower substrate 20.

It should be noted that the photosensitive coating 103 is arranged on the light-incoming side or the light-exiting side of the second base substrate 201 with respect to a non-transparent region of the second base substrate 201.

As the second base substrate 201 of the lower substrate 20 is disposed close to the backlight source 30, the photosensitive coating 103 is arranged on the light-incoming side or the light-exiting side of the second base substrate 201. As there is no obstruction such as other non-transparent patterns between the backlight source 30 and the photosensitive coating 103, the photosensitive coating 103 can sense the light of the backlight source 30 more delicately.

For the liquid crystal display device 01, as the black matrix 104 on the upper substrate 10 divides the display device into a transparent region and a non-transparent region, the photosensitive coating 103 can be disposed on the base substrate 201 corresponding to the black matrix of the upper substrate 10, and the area of the photosensitive coating 103 can be equal to the area of the black matrix 104.

In this way, on one hand, it can be avoided that the color of the photosensitive coating 103 will be changed due to sensing light emitted from light source other than the backlight source 30 and the signal processing unit will make a wrong judgment on the working state of the display device and affect the operation of the transparent solar battery 102, and on the other hand, the area of the photosensitive coating is as large as possible to delicately sense the light of the backlight source.

As for the transparent solar battery 102, for example, the transparent solar battery 102 can be disposed on a light-exiting side of the first base substrate 101, as illustrated in FIG. 6 or 8, or, for example, the transparent solar battery 102 can be disposed on a light-incoming side of the first base substrate 101, as illustrated in FIG. 7 or 9.

In consideration of Advanced-Super Dimension Switch (ADS) Thin Film Transistor-Liquid Crystal Display (TFT-LCD) having advantages, such as a high resolution, a high transmissivity, a low power consumption, a wide viewing angle, a high aspect ratio, a low chromatic aberration, no push Mura and so on, for example, the lower substrate can further comprise a common electrode 208.

Second Embodiment

Figure 10:
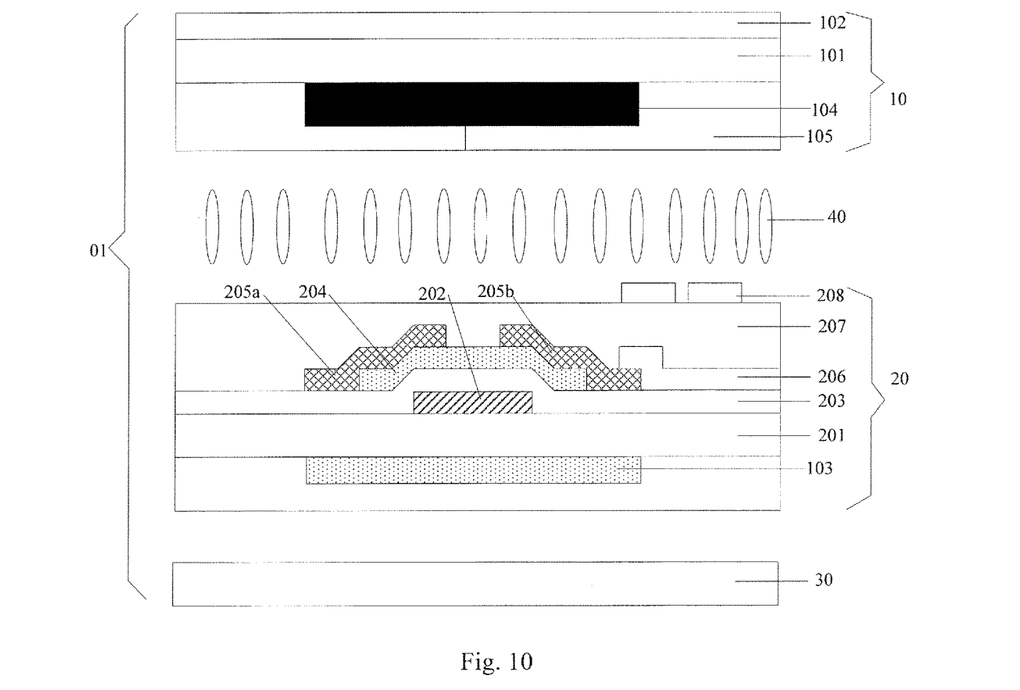
FIG. 10 is a structure schematic view of a liquid crystal display device according to a second embodiment of the present disclosure.

A second embodiment of the present disclosure provides a liquid crystal display device. As illustrated in FIG. 10, this liquid crystal display device 01 comprises a upper substrate 10, a lower substrate 20 disposed opposite to the upper substrate, a liquid crystal layer 40 arranged between the upper substrate and the lower substrate, a backlight source 30 arranged below the lower substrate 20 and a signal processing unit (not illustrated in the figure).

The upper substrate 10 comprises a first base substrate 101, a black matrix 104 arranged below the first base substrate 101, a color layer 105 arranged below the black matrix 104, and a transparent solar battery 102 arranged above a side of the first base substrate 101 which is opposite to the black matrix.

In this embodiment of the present disclosure, the black matrix 104 is firstly formed on the first base substrate 101, and then the color layer 105 arranged below the black matrix 104 is formed.

For example, the color layer 105 can comprise a red color filter, a green color filter, a blue color filter, and also color filters of other colors.

The lower substrate 20 comprises a gate electrode 202 disposed on a second base substrate 201, a gate insulating layer 203 disposed above the gate electrode 202 and the second base substrate 201, an active layer 204 a source electrode 205a and a drain electrode 205b arranged above the gate insulating layer 203, and a pixel electrode 206 electrically connected with the drain electrode 205b, a protection layer 207, and a common electrode 208 arranged above the protection layer 207.

The lower substrate 20 can further comprise a photosensitive coating 103 arranged on a light-incoming side of the second base substrate 201, and a protection layer arranged below the photosensitive coating 103 (not illustrated in the figure), wherein the position of the photosensitive coating 103 on the lower substrate corresponds to the position of the black matrix 104 on the upper substrate, and the area of the photosensitive coating 103 is equal to the area of the black matrix 104.

It should be noted that the lower substrate 20 is illustrated by taking a bottom gate type as an example in the embodiment of the present disclosure, but the embodiment of the present disclosure is not limited to this, the lower substrate 20 can also be of a top gate type. Furthermore, the embodiment of the present disclosure is illustrated only by taking the photosensitive coating 103 arranged on the light-incoming side of the second base substrate 201 and the transparent solar battery 102 arranged on the light-exiting side of the first base substrate 101 as an example, but the embodiment of the present disclosure is not limited to this.

The embodiment of the present disclosure provides a liquid crystal display device comprising an upper substrate 10, a lower substrate 20 disposed opposite to the upper substrate, a liquid crystal layer 40 arranged between the upper substrate and the lower substrate, a backlight source 30 arranged below the lower substrate, and a signal processing unit, wherein the upper substrate 10 comprises a transparent solar battery 102 arranged on a light-exiting side of a first base substrate, and a black matrix 104; the lower substrate 20 comprises a photosensitive coating 103 arranged on a light-incoming side of a second base substrate and corresponding to the black matrix 104. This display device further comprises a rechargeable battery configured to supply power to the display device. The transparent solar battery 102 is connected to the rechargeable battery via a switching device. As the resistance of the photosensitive coating 103 increases or decreases with respect to an initial resistance when the photosensitive coating senses the light from the backlight source, and maintains or recovers to be the initial resistance when the photosensitive coating does not sense the light of the backlight source, the signal processing unit can judge whether the display device is in a working state according to the size of the current of the photosensitive coating. When the display device is in the working state, the signal processing unit controls the switch device to switch it OFF such that the transparent solar battery 102 does not recharge the rechargeable battery. When the display device is in a standby state, the signal processing unit controls the switch device to switch it ON such that the transparent solar battery 102 recharges the rechargeable battery. In this way, a real-time recharging can be realized, a standby time can be elongated and endurance ability can be enhanced without disturbing the display device and increasing the computation load.

Embodiments of the present disclosure provide a recharging method for a display device. This method comprises: sensing light from a backlight source through a photosensitive coating; judging whether the display device is in a working state according to whether the photosensitive coating senses the light of the backlight source by a signal processing unit; and controlling a transparent solar battery to recharge by the signal processing unit when the display device is in a non-working state.

Here, the display device is any one of display devices comprising the above photosensitive coating and the above transparent solar battery.

Figure 11:
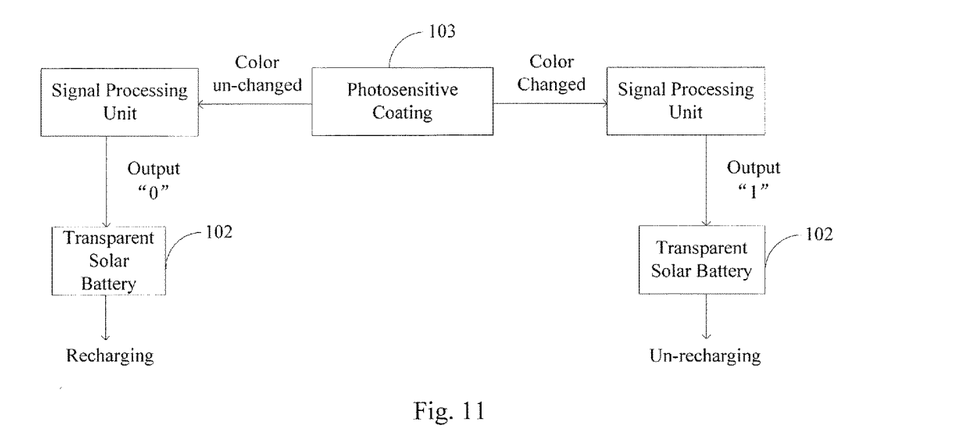
FIG. 11 is a schematic view of a recharging method of a display device according to an embodiment of the present disclosure.

For example, as illustrated in FIG. 11, the recharging method for a display device is as follows. When the photosensitive coating 103 is changed from an initial color state to a second color state after sensing the light from the backlight source 30, the signal processing unit can judge that the display device is in a working state according to this second color state, and output a signal "1" to a switching device to switch the switching device OFF, such that the solar battery 102 does not recharge the rechargeable battery. When the photosensitive coating recovers from the second color state to the initial color state or always maintains the initial color, the signal processing unit judges that the display device is in a standby state according to this initial color state and output a signal "0" to switch the switching device ON, such that the solar battery 102 recharges the rechargeable battery.

For example, the signal processing unit judging whether the display device is in the working state by means of the photosensitive coating: the signal processing unit judging that the display device is in the working state in the case that the resistance of the photosensitive coating varies with respect to an initial resistance and an output signal value is changed from an initial signal value to a second signal value; and the signal processing unit judging that the display device is in a non-working state in the case that the resistance of the photosensitive coating does not change with respect to the initial resistance and the output signal value is the initial signal value; wherein the initial resistance is the resistance when the photosensitive resistance coating does not sense the backlight source, the initial signal value correspondingly is the value of the output signal when the photosensitive coating does not sense the light of the backlight source, and the second output signal value is the value of the output signal when the photosensitive coating senses the light from the backlight source.

Figure 12:
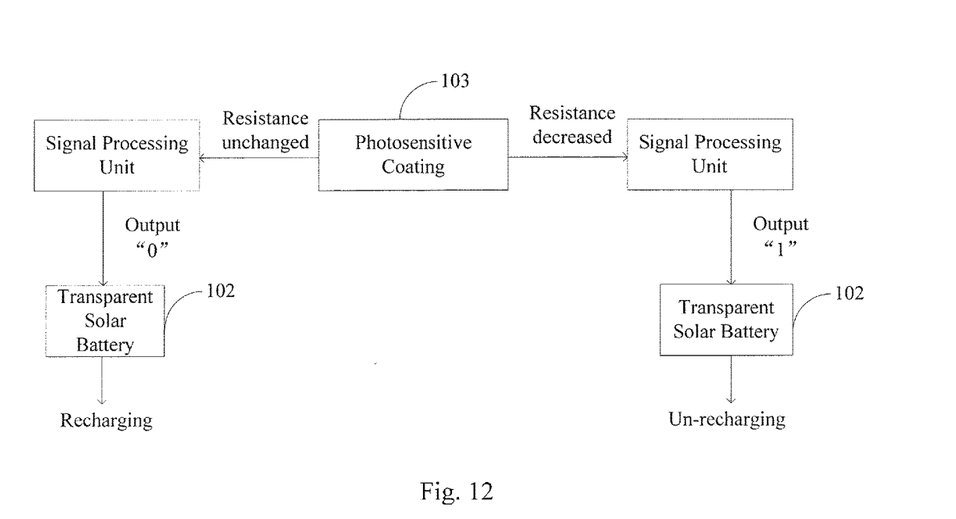
FIG. 12 is a schematic view of another recharging method of a display device according to an embodiment of the present disclosure.

For example, as illustrated in FIG. 12, the recharging method for a display device is as follows. When the photosensitive coating 103 does not sense the light of the backlight source 30, the resistance thereof is the initial resistance, the value of the output signal thereof is the initial signal value, and the output signal can be a voltage signal or a current signal. When the photosensitive coating 103 senses the light of the backlight source 30 and the resistance thereof decreases from the initial resistance to the second resistance, the value of the output signal thereof is changed from the initial signal value to the second signal value which is different from the initial signal value, and the signal processing unit judges that the display device is in the working state according to the second signal value and output the signal "1" to the transparent solar battery such that the transparent solar battery 102 does not recharge the rechargeable battery. When the photosensitive coating 103 does not sense the light of the backlight source 30 any longer, the resistance thereof recovers from the second resistance to the initial resistance, the value of the output signal thereof recovers from the second signal value to the initial signal value, and the signal processing unit judges that the display device is in the standby state according to this initial signal value and output the signal "0" to the transparent solar battery such that the transparent solar battery 102 recharges the rechargeable battery.

The transparent solar battery comprises the switching device which receives the output signal of the signal processing unit. When the switch device receives the signal "1", this switch device is switched OFF, and the transparent solar battery does not recharge the rechargeable battery. When the switch device receives the signal "0", this switch device is switched ON, and the transparent solar battery recharges the rechargeable battery.

Embodiments of the present disclosure provide a recharging method for a display device. This method comprises: a photosensitive coating sensing light from a backlight source; a signal processing unit judging whether the display device is in a working state according to whether the output signal of the photosensitive coating changes; and switching a switching device ON when the display device is in a non-working state such that a transparent solar battery is capable of recharging a rechargeable battery. In this way, real-time charging can be realized, a standby time can be elongated and endurance ability can be enhanced without disturbing the display device and increasing the computation load thereof.

The above are only the example embodiments of the disclosure, and are not intended to limit the protection scope of the disclosure. The protection scope of the disclosure is determined by the appending claims.

What is claimed is:

1. A display device comprising a display panel, a backlight source and a rechargeable battery, wherein the display panel has an upper substrate and a lower substrate disposed opposite to the upper substrate, the backlight source is situated on a side of the display panel facing the lower substrate, and the rechargeable battery is configured to supply power to the display device, and the display device further comprises:
 a transparent solar battery arranged at the upper substrate and configured to recharge the rechargeable battery of the display device;
 a photosensitive coating disposed in a non-transparent region of the display panel and configured to sense light from the backlight source; and
 a signal processing unit connected to the photosensitive coating and the transparent solar battery, wherein the signal processing unit detects changes of the signal from the photosensitive coating, determines a working state of the display device, and makes the transparent solar battery recharge or not recharge according to the working state of the display device.

2. The display device according to claim 1, wherein the photosensitive coating is a photosensitive resistance coating.

3. The display device according to claim 2, wherein an area of the photosensitive coating is equal to or less than an area of the non-transparent region opposite to the photosensitive coating.

4. The display device according to claim 2, wherein the photosensitive coating is arranged on a light-incoming side of a black matrix of the upper substrate.

5. The display device according to claim 2, wherein the photosensitive coating is arranged on a light-incoming side of a base substrate of the lower substrate or a light-exiting side of a base substrate of the lower substrate.

6. The display device according to claim 2, wherein the transparent solar battery is arranged on a light-incoming side of a base substrate of the upper substrate or a light-exiting side of a base substrate of the upper substrate.

7. The display device according to claim 1, wherein an area of the photosensitive coating is equal to or less than an area of the non-transparent region opposite to the photosensitive coating.

8. The display device according to claim 7, wherein the photosensitive coating is arranged on a light-incoming side of a black matrix of the upper substrate.

9. The display device according to claim 7, wherein the photosensitive coating is arranged on a light-incoming side of a base substrate of the lower substrate or a light-exiting side of a base substrate of the lower substrate.

10. The display device according to claim 7, wherein the transparent solar battery is arranged on a light-incoming side of a base substrate of the upper substrate or a light-exiting side of a base substrate of the upper substrate.

11. The display device according to claim 1, wherein the photosensitive coating is arranged on a light-incoming side of a black matrix of the upper substrate.

12. The display device according to claim 1, wherein the photosensitive coating is arranged on a light-incoming side of a base substrate of the lower substrate or a light-exiting side of a base substrate of the lower substrate.

13. The display device according to claim 1, wherein the transparent solar battery is arranged on a light-incoming side of a base substrate of the upper substrate or a light-exiting side of a base substrate of the upper substrate.

14. The display device according to claim 1, wherein the transparent solar battery comprises a switching device which is a switching diode or a switching triode.

15. The display device according to claim 14, wherein the switching device is connected to the signal processing unit and is switched between OFF/ON under the control of the signal processing unit.

16. The display device according to claim 1, wherein the lower substrate further comprises a pixel electrode and a common electrode.

17. A recharging method for a display device comprising a display panel, a backlight source and a rechargeable battery, wherein the display panel has an upper substrate and a lower substrate disposed opposite to the upper substrate, the backlight source is situated on a side of the display panel facing the lower substrate, and the rechargeable battery is configured to supply power to the display device, and the display device further comprises: a transparent solar battery arranged at the upper substrate and configured to recharge the rechargeable battery of the display device; a photosensitive coating disposed in a non-transparent region of the display panel and configured to sense light from the backlight source; and a signal processing unit connected to the photosensitive coating and the transparent solar battery, wherein the signal processing unit detects changes of the signal from the photosensitive coating, determines a working state of the display device, and makes the transparent solar battery recharge or not recharge according to the working state of the display device, the recharging method comprising:

sensing light from the backlight source through the photosensitive coating, wherein an output signal of the photosensitive coating changes upon the photosensitive coating sensing the light;

determining a state of the display device by the signal processing unit according to changes of the output signal of the photosensitive coating; and controlling the transparent solar battery to recharge a rechargeable battery of the display device by the signal processing unit in the case that the display device is in a non-working state.

18. The recharging method according to claim 17, wherein determining the state of the display device by the signal processing unit according to changes of the output signal of the photosensitive coating comprises:

determining by the signal processing unit that the display device is in a working state in the case that the output signal of the photosensitive coating changes with respect to an initial signal; and determining by the signal processing unit that the display device is in a non-working state in the case that the output signal of the photosensitive coating does not change with respect to the initial signal;

wherein the initial signal is a signal output by the photosensitive coating in a case that the photosensitive coating does not sense the light of the backlight source.

19. The recharging method according to claim 17, wherein the signal processing unit controls a switching device of a solar battery to switch it ON such that the solar battery recharge a rechargeable battery in a case that the display device in a non-working state.

20. The recharging method according to claim 17, wherein the changes of the output signal of the photosensitive coating are changes in voltage, current or resistance.

* * * * *